United States Patent
Wuest

[11] Patent Number: 5,992,137
[45] Date of Patent: Nov. 30, 1999

[54] SUPPORTING DISC FOR A SUPPORTING DISC BEARING OF OPEN-END SPINNING ROTORS AND PROCESS OF MAKING SAME

[75] Inventor: Hans Wuest, Thal, Switzerland

[73] Assignee: Spindelfabrik, Suessen, Schurr, Stahlecker & Grill GmbH, Suessen, Germany

[21] Appl. No.: 09/272,378

[22] Filed: Mar. 19, 1999

[30] Foreign Application Priority Data

Mar. 19, 1999 [DE] Germany .............. 198 18 125

[51] Int. Cl.⁶ .................................................. D01H 4/00
[52] U.S. Cl. .................. 57/406; 57/404; 384/276; 384/549
[58] Field of Search .................. 384/549, 276; 57/404, 406

[56] References Cited

U.S. PATENT DOCUMENTS

| | | | |
|---|---|---|---|
| 4,713,932 | 12/1987 | Zott | 57/406 |
| 4,892,422 | 1/1990 | Stahlecker | 384/549 |
| 5,423,616 | 6/1995 | Gotz | 384/549 |
| 5,517,814 | 5/1996 | Stahlecker | 57/406 |

FOREIGN PATENT DOCUMENTS 1962247  7/1970  Germany .

*Primary Examiner*—William Stryjewski
*Attorney, Agent, or Firm*—Evenson McKeown Edwards & Lenahan, PLLC

[57] ABSTRACT

A supporting disc for a supporting disc bearing of open-end spinning rotors consists of a disc-like base body and a running ring made of plastic. There are small, ball-shaped filling bodies, preferably of glass, embedded in the running ring. These filling bodies, which amount to between 0.1 and 10% of the total volume, have a diameter of, for example, 0.1 to 0.3 mm. After the peripheral surface of the running ring has been machined, a more or less porous running surface arises.

21 Claims, 2 Drawing Sheets

SUPPORTING DISC FOR A SUPPORTING DISC BEARING OF OPEN-END SPINNING ROTORS AND PROCESS OF MAKING SAME

BACKGROUND AND SUMMARY OF THE INVENTION

This application claims the priority of German application 198 18 125.6, filed in Germany on Apr. 23, 1998, the disclosure of which is expressly incorporated by reference herein.

The present invention relates to a supporting disc for a supporting disc bearing of open-end spinning rotors comprising a disc-like base body and a running ring made of plastic and having a running surface.

U.S. Pat. No. 4,713,932 exemplifies supporting discs of this general type. Such supporting disc bearings are not in general encapsulated towards the outside. It can occur therefore that fly, trash or avivage establishes itself at the spinning rotors in the area of the support discs, which can lead to an untrue running. In the case of certain running ring materials, it can even happen that so-called chatter marks occur on the running surfaces.

It is an object of the present invention to significantly reduce the polluting of the open-end spinning rotor and also the occurrence of chatter marks.

This object has been achieved in accordance with the present invention in that small, ball-shaped filling bodies are embedded in the running ring.

The filling bodies give the running ring other flexible properties. The ball-shaped filling bodies can be made of plastic or preferably, of glass, and be hollow. The filling bodies are added to the liquid plastic when the running ring is cast onto the base body, namely, according to the application purpose, with a volume of between 0.1 and 10% of the total. The diameter of the ball-shaped filling bodies lies, for example, in the range of 0.1 to 0.3 mm.

Although the filling bodies are distributed over the entire interior of the running ring, they are needed mostly on the running surface. Due to the usual machining of the running surface, a few filling bodies break out of the running surface, so that tiny pores arise thereon. Other filling bodies are cut off during machining, others remain anchored in the running ring and project only partly out of the running surface. The running surface gives the optical impression of being slightly porous. Surprisingly, it has been established that owing to these measures, less trash accumulates on the open-end spinning rotor, and practically no chatter marks occur on the running surfaces of the supporting discs.

The applicants still have no explanation for this phenomenon. It is thought to some extent that due to the ball-shaped filling bodies on the running surface, the heat transfer from the open-end spinning rotors to the running ring is reduced, so that less or even no chatter marks occur. Another explanation could be that a hard skin, which usually forms on the running surface when the plastic cools, does not quite assert itself due to the effect of the filling bodies, so that chatter marks arising as a result of the hard skin do not now occur anymore.

As for the reduced soiling of the open-end spinning rotor, the applicants presume that the filling bodies have an erasing effect and thus keep the open-end spinning rotor constantly clean. The altered temperature and flexing work caused by the filling bodies could also have a positive influence. This seemingly does not involve an increase in wear of the bearing points, as the shafts of the open-end spinning rotors are usually coated against wear.

It is known from German published patent application 19 62 247 to provide the plastic supporting rollers of false twist spindles with hair-like reinforcing elements made of carbon. The aim thereof, however, is to improve the poor heat conducting properties of the plastic, so that the heat can be better conducted to a base body supporting the plastic running ring.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
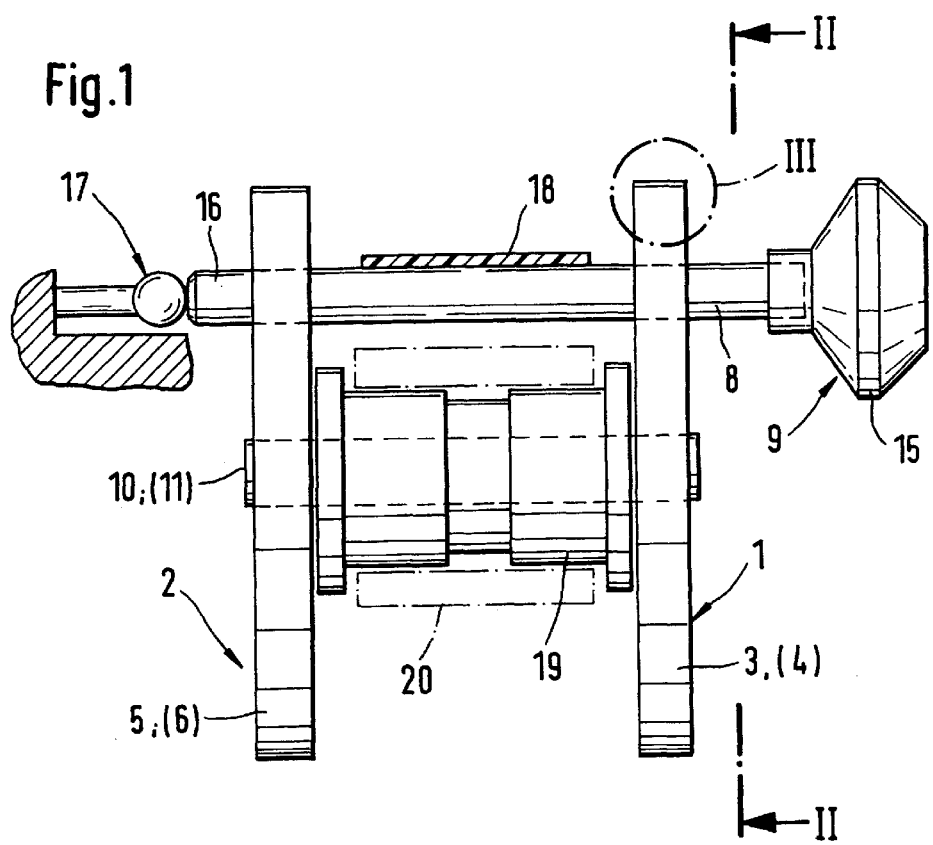
FIG. 1 is a part sectional longitudinal view of a supporting disc bearing assembly constructed according to the present invention.
Figure 2:
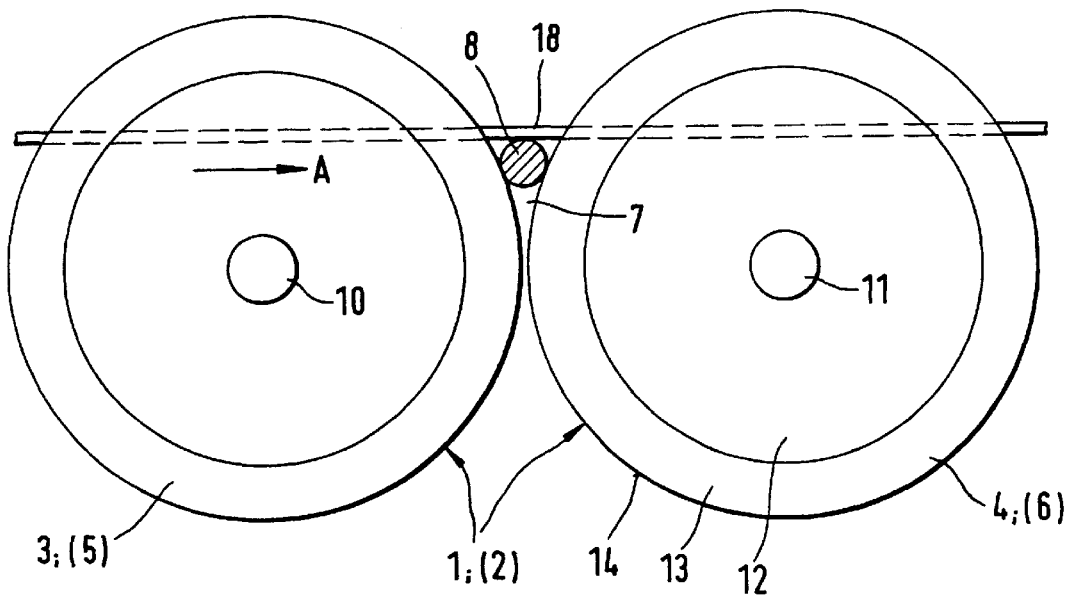
FIG. 2 is a view along the intersecting surface II—II of FIG. 1.

The supporting disc bearing for open-end spinning machines shown in FIGS. 1 and 2 comprises two supporting disc pairs 1 and 2 having each two supporting discs 3 and 4 or 5 and 6. The two supporting disc pairs 1 and 2 form wedge-shaped gaps 7, in which the shaft 8 of an open-end spinning rotor 9 is radially supported. The supporting discs 3,5 and 4,6 located on one side adjacent to the shaft 8 are arranged on a common axle 10 or 11.

The supporting discs 3,4,5 and 6 are essentially identically designed. They each consist of a metal disc-shaped base body 12, whose outer periphery is provided with a damping running ring 13. The four running rings 13 each form a cylindrical running surface 14 for the shaft 8 of the open-end spinning rotor 9, which supports a rotor cup 15 at one end. The other end 16 is supported in axial direction against a step bearing 17.

The shaft 8 is loaded with a tangential belt 18, which passes in longitudinal direction along the open-end spinning machine in running direction A and hereby drives the open-end spinning rotors 9 of at least one machine side.

The supporting discs 3,4,5 and 6 are each provided with a bore hole (not shown), with which they are placed onto the respective axles 10 and 11. The axles 10 and 11 are each taken up in a bearing housing 19, to which a common bearing support 20, denoted only by a dot-dash line, is arranged, and which is affixed to the machine frame.

Figure 3:
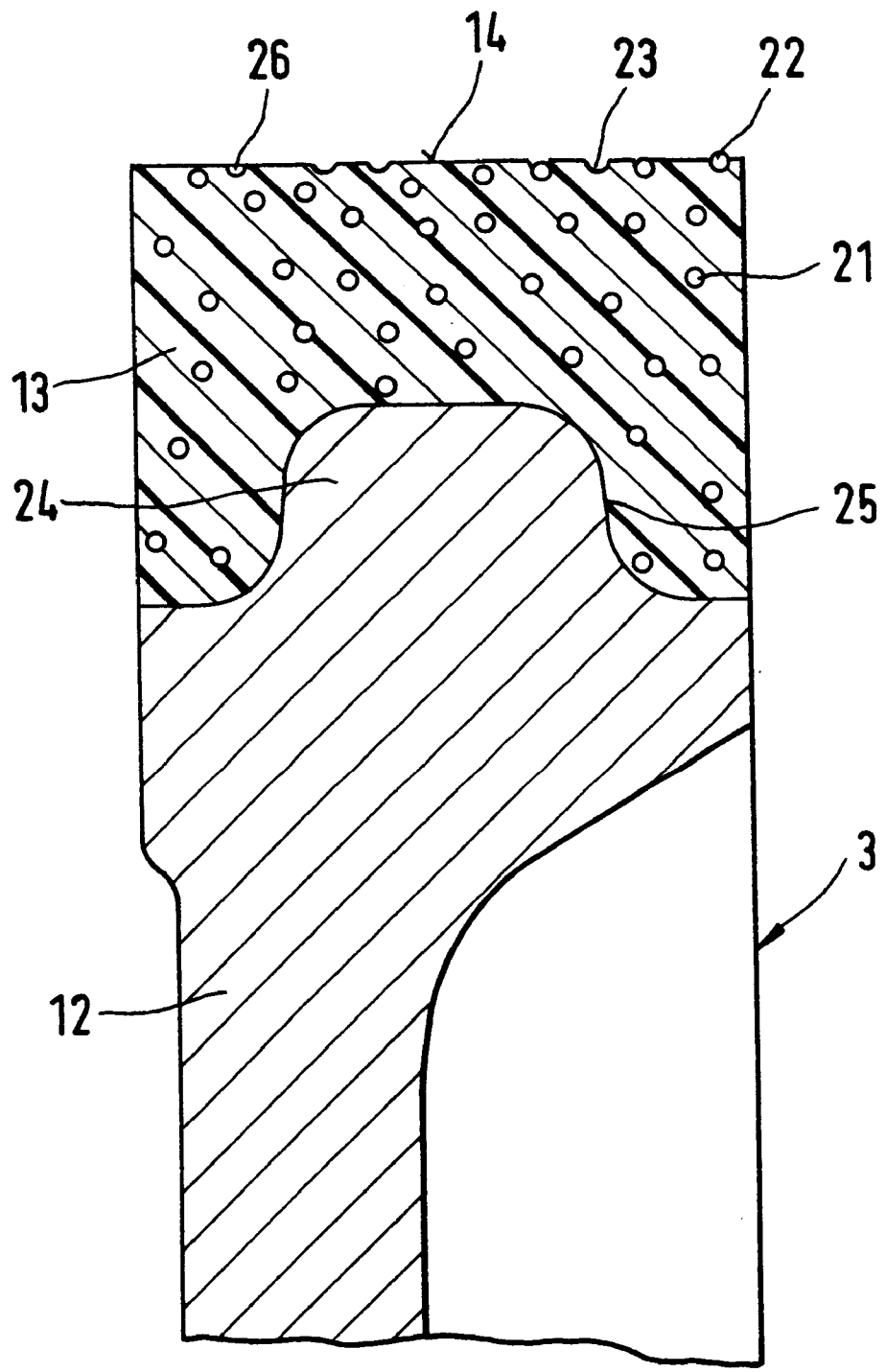
FIG. 3 is in greatly enlarged form a sectional part view of FIG. 1 in the area of the dot-dash circle III.

As can be seen from the enlarged view in FIG. 3, the inside of the running ring 13 is interspersed with a plurality of ball-shaped filling bodies 21, preferably hollow glass balls. These filling bodies 21 are exaggerated in size in FIG. 3 and have in reality a diameter in the order between 0.1 and 0.3 mm.

The filling bodies 21, which are added to the liquid plastic when the running ring 13 is cast onto the base body 12, and which filling bodies 21 are distributed over the entire inside of the running ring 13, are really only required on the running surface 14. During the usual machining of the running surface 14, there are areas in which absolutely no filling bodies 21 are located. There are other areas where individual filling bodies 21 border on the running surface 14, as shown with the aid of a filling body 22. There are further filling bodies 21, which are cut through during machining, as shown by a filling body 26. Finally there are some filling bodies 21 which break out of the running surface 14 during machining, so that small porous spots 23 arise. When the running surface 14 is viewed under a magnifying glass, it seems as though the running surface 14 is slightly porous.

The proportion of the total volume taken up by the filling bodies 21 on the running ring 13 amounts, according to requirement, to between 0.1 and 10%.

Tests have established that running rings 13 having such filling bodies 21 tend towards less soiling of the shaft 8 in the area of the supporting disc pairs 1 and 2 and furthermore, that the running surfaces 14 have less chatter marks than before. The reasons for this are, as explained above, not known to the applicant.

As can be further seen from FIG. 3, the running ring 13 is anchored to the base body 12 by means of a so-called cap profile 24. This cap profile 24 has at least almost radial flanks 25, which are well rounded in relation to the surfaces extending in peripheral direction. By means of this embodiment, the connection between the running ring 13 and the base body 12 during operation of the open-end spinning machine is not loaded by tension but rather by shearing action, which is less detrimental to the hold of the running ring 13 to the base body 12. Due to the cap profile 24, the cast-on running ring 13 holds very well to the base body 12 even without form closure. The load, occurring mainly in the form of shearing action, is essentially effected by the radial flanks 25.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supporting disc for a supporting disc bearing for an open-end rotor spinning machine comprising a disc-like base body and a plastic running ring having a running surface, wherein small ball-shaped filling bodies are embedded in the running ring.

2. A supporting disc according to claim 1, wherein the filling bodies are made of plastic.

3. A supporting disc according to claim 2, wherein the filling bodies have a diameter of 0.1 to 0.3 mm.

4. A supporting disc according to claim 3, wherein the filling bodies make up between 0.1 to 10% of the total volume of the plastic running ring.

5. A supporting disc according to claim 2, wherein the filling bodies make up between 0.1 to 10% of the total volume of the plastic running ring.

6. A supporting disc according to claim 1, wherein the filling bodies are made of glass.

7. A supporting disc according to claim 6, wherein the filling bodies have a diameter of 0.1 to 0.3 mm.

8. A supporting disc according to claim 7, wherein the filling bodies make up between 0.1 to 10% of the total volume of the plastic running ring.

9. A supporting disc according to claim 6, wherein the filling bodies make up between 0.1 to 10% of the total volume of the plastic running ring.

10. A supporting disc according to claim 1, wherein the filling bodies have a diameter of 0.1 to 0.3 mm.

11. A supporting disc according to claim 10, wherein the filling bodies make up between 0.1 to 10% of the total volume of the plastic running ring.

12. A supporting disc according to claim 1, wherein the filling bodies make up between 0.1 to 10% of the total volume of the plastic running ring.

13. A process for making a supporting disk for a supporting disc bearing for an open-end rotor spinning machine, comprising:

providing a disc-like base body, and casting a plastic running ring on the base body with small ball-shaped filling bodies added to liquid plastic forming the running ring.

14. A process according to claim 13, comprising machining a running surface on the running ring after said casting.

15. A process according to claim 14, wherein the filling bodies have a diameter of 0.1 to 0.3 mm.

16. A process according to claim 13, wherein the filling bodies are made of plastic.

17. A process according to claim 16, wherein the filling bodies have a diameter of 0.1 to 0.3 mm.

18. A process according to claim 13, wherein the filling bodies are made of glass.

19. A process according to claim 13, wherein the filling bodies have a diameter of 0.1 to 0.3 mm.

20. A process according to claim 13, wherein the filling bodies make up between 0.1 to 10% of the total volume of the plastic running ring.

21. A process according to claim 20, wherein the filling bodies have a diameter of 0.1 to 0.3 mm.

* * * * *